US005563985A

United States Patent [19]
Klassen et al.

[11] Patent Number: 5,563,985
[45] Date of Patent: Oct. 8, 1996

[54] IMAGE PROCESSING METHOD TO REDUCE MARKING MATERIAL COVERAGE IN PRINTING PROCESSES

[75] Inventors: R. Victor Klassen, Webster; Andrew G. Trobia, Rochester, both of N.Y.

[73] Assignee: Xerox Corporation, Stamford, Conn.

[21] Appl. No.: 177,494

[22] Filed: Jan. 5, 1994

[51] Int. Cl.$^6$ ..................................................... G06F 3/12
[52] U.S. Cl. ........................................ 395/109; 395/117
[58] Field of Search ...................................... 395/101, 109, 395/117, 128; 358/526, 456, 466

[56] References Cited

U.S. PATENT DOCUMENTS

| | | | |
|---|---|---|---|
| 4,736,315 | 4/1988 | Ozaki et al. | 364/582 |
| 4,930,018 | 5/1990 | Chan et al. | 358/298 |
| 4,999,646 | 3/1991 | Trask | 346/11 |
| 5,068,649 | 11/1991 | Garrett | 340/793 |
| 5,130,823 | 7/1992 | Bowers | 358/466 |
| 5,170,711 | 12/1992 | Maier et al. | 101/365 |
| 5,237,344 | 8/1993 | Tasaki et al. | 346/140 R |
| 5,278,671 | 1/1994 | Takahashi et al. | 358/456 |
| 5,353,387 | 10/1994 | Petschik et al. | 345/109 |

OTHER PUBLICATIONS

J. A. C. Yule; "Principles of Color Reproduction"; J. Wiley & Sons, 1967.

Klassen; "Reducing Ink Coverage Levels in Binary CMYK Images"; Proc. Soc. Imaging Science & Technology; 46$^{th}$ Annual Conference; May 1993.

T. G. Lewis et al.; "Generalized Feedback Shift Register Pseudorandom Number Alogorithm"; Journal of the Association for Computing Machinery, vol. 20, No. 3, Jul. 1973; pp. 456–468.

H. S. Bright et al.; "Quasi–Random Number Sequences from a Long–Period TLP Generator with Remarks on Application to Cryptography"; Computing Surveys, 11, 4, 1979.

*Primary Examiner*—Raymond J. Bayerl
*Assistant Examiner*—Gabriel I. Garcia
*Attorney, Agent, or Firm*—Mark Costello

[57] ABSTRACT

A method for processing images for printing includes the steps for each separation, making a pixel level determination of marking material coverage, based on the number of pixels within a given area that are turned on; if a determination is made that too much marking material will be placed within the given area, using a random number function for turning off a fraction of pixels in the area to reduce the amount of marking material that will be used for the given area; and to preventing artifacts from occurring in the pixel reduction step by utilizing a processing order through each given area which tends to randomize the turn off effect. Additionally, the results of the determination are compared for each separation, to determine that the turnoff result allows at least one corresponding pixel among each of the separations to be turned ON.

18 Claims, 8 Drawing Sheets

IMAGE PROCESSING METHOD TO REDUCE MARKING MATERIAL COVERAGE IN PRINTING PROCESSES

CROSS REFERENCE

Cross Reference is made and priority is claimed from U.S. patent application Ser. No. 07/917,643 to Klassen filed Jul. 23, 1992.

This invention relates to an image processing method for reducing the amount of marking material required to print a colored image, to avoid problems common to the use of excessive amounts of ink.

BACKGROUND OF THE INVENTION

Full color printing has become a desired goal of office products. One type of full color printer which has significant potential for fulfilling such a goal is the ink jet printer. In one common design of such printers, a reservoir of liquid ink is connected to an ink output orifice via a capillary tube. In the tube, a heater element is provided, responsive to an ON/OFF or binary printing signal. When printing is required and a printing signal is directed to the heater element, the heater element rapidly heats ink in the capillary tube adjacent thereto to a gaseous state, producing a pressure differential which expels a droplet of ink from the orifice, directing the droplet to a sheet of receiving material, such as paper. Color printing is accomplished by providing multiple layers or separations of ink on the page. Commonly, colors are provided by subtractive combinations of cyan, magenta and yellow inks. To print black, a combination of equal amounts of cyan, magenta and yellow is printed, or a fourth black ink is used as a substitute. Undercolor removal, a well known process in the printing arts, can be used to print a single layer of black ink as a substitute for the combination of equal amounts of cyan, magenta and yellow. For a fuller discussion of under color removal and its application to electronically derived or created images, reference is made to J. A. C. Yule, *Principles of Color Reproduction*, (John Wiley & Sons, Inc., New York, 1967), pages 294–327. Other full color printing processes may use dry powder or liquid toners.

A problem of ink jet printers is that the liquid inks used have a finite drying time, which tends to be somewhat longer than desirable. Further, the drying time of any particular area is at least partly a function of the amount of ink deposited on that area. While satisfactory drying times are possible with black-only or single separation printing, once multiple separations are required, the large amount of liquid on the page causes the problems of ink puddling or pooling, bleeding to adjacent image areas, and flow through to the back side of the receiving material. Paper cockle is also a problem due to saturation of the paper receiving material and subsequent rapid drying. Particularly, problems are noted in the printed image at high ink coverage areas, and high coverage areas where high contrast image edges occur. While certain materials variations, such as different inks or special papers may resolve some of these problems, each brings its own distinct problems to the process. While special treated papers optimized for ink jet use are available, plain papers are preferred from cost and convenience standpoints.

Using one available set of materials, a maximum ink coverage of less than 150% is required, on average, over large areas, for printing without artifacts resulting from too much ink. As used herein, ink coverage refers to the number of ON pixels in a region for all the separations, divided by the total number of pixels in the region in one separation. Without undercolor removal, a typical full color image may require ink coverage in the range of 200–300%. With undercolor removal, maximum ink coverage may be down to 200%, but in regions of saturated secondary colors, where full amounts of two inks are required, it can be reduced no further.

For cost reasons, it is highly desirable for the process to operate irrespective of image content, or on the separation binary bitmaps without further image information. That is, the process should be able to work on any type of image, whether it contain text, graphics, or a halftoned image, without being informed of which portions contain text or halftoned images, or graphics.

While ink jet printing has a notable problem with the case of high ink coverage, other printing processes also have problems with excessive marking material. Notably, electrophotographic printing methods using printing process for forming a latent image for development by dry or liquid toner marking materials, can suffer from excessive marking material, evidenced by sheet cockling, and curling caused by differential shrinkage of toner and paper in the printing process.

Tasaki and Shiga (U.S. Pat. No. 5,237,344) describe a method for reducing the amount of ink printed to 50%, 75% or 66%. The method uses fixed patterns of turn-off locations (e.g., a checkerboard for 50%) and selects the pattern based on the printing mode (reverse character mode, block graphic mode or normal character mode), the character selected, and possibly the relative humidity. Apparently, the method is designed for single color (black) printing: if it were used for multiple separation (e.g., red formed from yellow and magenta) printing, both separations would be turned off in the same place, resulting in more obvious patterns. The small set of fixed turn-off patterns makes the method very sensitive to line angle, as lines at some angles will have more pixels turned off than others. Also the method is only useful for characters from a built-in font, including graphic characters: arbitrary fonts and shapes, such as are requested in documents created using industry standard page description languages e.g. PCL or PostScript, cannot be handled in this way.

U.S. Pat. No. 4,930,018 to Chan et al. teaches the reduction of paper cockle and graininess of ink jet prints. Printing of a given scan line occurs multiple times, with three different dye loadings, with pixels requiring the highest dye loading printed on one pass, pixels requiring an intermediate dye loading printed on another pass, and pixels requiring the lowest dye loading on another pass. The method takes as input continuous tone RGB (red—green—blue) images and performs RGB-CMYK (cyan—magenta—yellow key or black) conversion with full under color removal. As understood, printing is performed at half resolution, so that "pixels" in the input image correspond to 2×2 blocks in the output image. The image data is first error diffused from 8 bits per pixel per separation to 4 bits pixel per separation. Then, for each pixel, a count of up to 4 drops of each dye loading is computed, for each separation. There are multiple choices, ranked in order of total ink coverage. If the highest coverage choice exceeds the maximum allowable coverage, the separation with highest coverage is changed to use a lower coverage value for the same gray level, if possible. If it is not possible to stay at the same gray level, the gray level for that separation is dropped by one, and the error passed on to neighbors. The process iterates until the total ink coverage is as low as required. Pixels within the 2×2 block are assigned values (0 or 1) by proceeding around the block in clockwise order, and filling in pixels in order. First, the high dye load pixels are turned on, then the medium, then the low. Within each dye loading group, first black is turned on, until there are no more black pixels of that dye loading, then the next pixels in the cycle are cyan, until there are no more cyan required, then magenta, and yellow, and then the next dye load group. By maximizing ink coverage and using multiple dye loadings, they reduce the noisiness of the image, and by maintaining the total ink coverage within known limits, they prevent the many problems associated with excessive ink.

U.S. Pat. No. 4,999,646 to Trask teaches limiting coverage to 100% coverage (by the above definition of coverage), or perhaps between 100 and 200% coverage (if 100% corresponds exactly to no white spaces on a page), owing to the circular shape and overlap of print dots. Coverage is limited by using 2×2 super pixels and assigning each one drop per pixel in a combination that depends on the color required. Assuming one bit per separation input with full undercolor removal, there are eight possible colors that could be requested (including white). In order to reduce patterning due to the multiple swaths, two passes are used, each of a checkerboard pattern of pixels (the two passes being offset to provide full coverage). The two pass process allows ink to dry between passes.

The method taught in U.S. patent application Ser. No. 07/917,643 by Klassen, filed Jul. 23, 1992, reduces ink coverage in typical documents including heavily saturated regions of continuous tone images (see also, Klassen, "Reducing Ink Coverage Levels in Binary CMYK Images", Proc. Soc. Imaging Science and Technology, 46th Annual Conference (May, 1993), pp. 173–175). To prevent artifacts from occurring in the pixel reduction step, a processing path through each given area is used which tends to "randomize" the turn off effect. However, it was found in further experimentation with the process that the space filling curves described did not completely eliminate periodic artifacts from occurring from the coverage reduction process, especially in large regions of constant color.

SUMMARY OF THE INVENTION

In accordance with the invention, there is provided a method for reducing the amount of marking material used in a printer to reduce marking materials coverage in full color images to less than 200%, while minimally affecting the appearance of the color image.

In accordance with one aspect of the invention, in a device for processing images for printing, a method of reducing marking material coverage includes the steps of: making a determination of marking material coverage for an area of the image, based on the number of pixels within the given area that are turned ON. Subsequently, if a determination is made that too much marking material will be printed within the given area, a fraction of the pixels in the area are turned off in each separation to reduce the amount of marking material that will be used for the given area. To prevent artifacts from occurring in the pixel reduction step, a processing path through each given area is used which tends to randomize the turn off effect. A decision to turn OFF or ON the pixels along the path is based on the turn off ratio and a random factor, to reduce artifacts of the coverage reduction process.

In accordance with another aspect of the invention, the method of determining marking material coverage within a given area includes the steps of: identifying density values of a set of pixels within a subset of the given area of the image for each separation; using the pixel values in the subset as addresses to a Look Up Table (LUT), each address entry in the LUT having associated with it a data entry representing a predicted amount of marking material coverage that will be printed within the subset of the area, given the pixel values in the given area. The process is repeated for all the subsets within the given area, and the address values are summed to determine the amount of marking material resulting from each separation. The marking material coverage value for each separation is summed to determine the total amount of ink that will be used.

In accordance with still another aspect of the invention, the method of determining how many pixels should be turned OFF includes the step of determining, from the predicted amount of marking material coverage, what fraction of the pixels within the given area which should be turned OFF. Then, for each pixel that is ON in each separation, a determination is made as to whether that pixel should be turned OFF, in accordance with a function dependent on the condition of previously processed pixels, the fraction to be turned off, and a random factor. In this step, a second condition may be applied to the turn OFF decision, based on whether, for all the separations, the same pixel has been turned off, to prevent the case of no color at the particular position in the image.

In accordance with yet another aspect of the invention, the method of avoiding patterns which might appear as image processing artifacts includes the step of processing pixels within a given area in an order that tends to prevent moiré patterns from arising. Accordingly, a path of processing pixels in accordance with the previously described turn OFF determination is selected so that, for a uniform area and a constant fraction of pixels turned OFF, the turned OFF pixel is at a different position in each scan line. One useful path is an area filling curve.

The present invention is directed to a method of changing each separation in a color image in a manner that reduces the number of ON pixels in each separation, and accordingly the marking material deposited over an image. A turn OFF ratio determination is made based on the multiple separation image. The same fraction of pixels is turned off in each separation, so that the overall hue of the image is not shifted. Interestingly, the brightness of color changes little in the image processed by the inventive method, suggesting that the excess deposited marking material did not contribute to color brightness. The reduction of pixels is accomplished in a manner avoiding patterns, to reduce moiré. The reduction in the number of ON pixels only occurs in areas where there is too much marking material.

These and other aspects of the invention will become apparent from the following descriptions to illustrate a preferred embodiment of the invention read in conjunction with the accompanying drawings in which.

Figure 1:
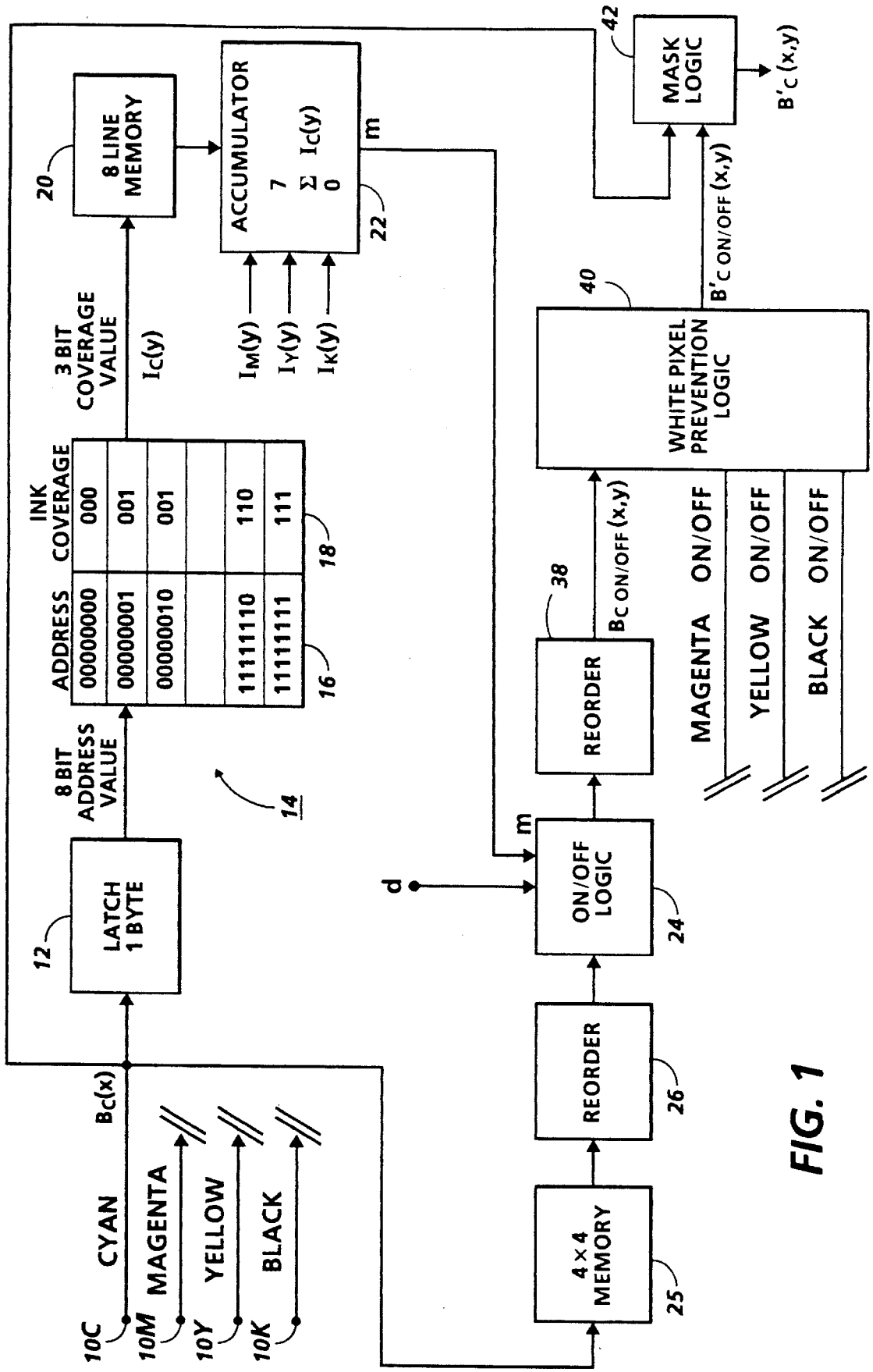
FIG. 1 is a functional block diagram of a system for carrying out the present invention.

Referring now to the drawings where the showings are for the purpose of describing the preferred embodiment of the invention and not for limiting same, a basic functional block diagram for a system for carrying out the present invention is shown in FIG. 1. A plurality of video inputs $10c$, $10y$, $10m$, and $10k$, each representing one of the cyan, magenta, yellow or black separations ($B_N(x,y)$) of image $B(x,y)$ is directed into the ink coverage reduction system. Since the process of the system is mostly redundant for each separation, initially only the cyan bitmap $B_C(x,y)$ will be described. Bitmap $B_C(x,y)$ is a binary bitmap in this system, defined along fast (x-axis) and slow scan (y-axis) axes, describing the image in terms of 1 bit pixels arrayed in scan lines. Each pixel is an image signal, which may be said to have a condition or image state, which describes for a binary pixel whether a print dot will be made at the output or not. This may also be equated to whether the pixel is ON or OFF, 1 or 0. Thus, there are two image states for any pixel in a binary printer. For a multilevel printer, there may be more than two pixel values, and a similarly larger number of pixel image states.

To determine ink coverage over a given area, bitmap $B_C(x,y)$ is directed initially to a one byte (8 bit) latch 12, which stores eight one bit pixel values in order 1 to 8. This 8 bit stored binary string, which represents the bitmap image in an 8 pixel×1 scan line portion of the given area, is used as an address to access a 256 entry look up table (LUT) 14. The data stored at each of addresses 16 in the look up table represents ink coverage values 18, for the 8 pixel area stored at latch 12. It will no doubt be appreciated that many of these ink coverage values are the same, as shown by the demonstration of address 00000001 and address 00000010, which each have ink coverage values of 1. Should ink coverage be non-linear in character, because, for example, the ink jet device tends to deposit more or less ink when operated in certain image formations, then such non-linearity may be accounted for in loading the LUT 14 values.

Ink coverage values 18, which in the example can be represented by 3 bit binary values, now form a signal or function $I_C(x,y)$, representing predicted ink coverage in an 8 pixel×1 scan line. A group of these values, stored in 8 row memory 20, are summed together at accumulator 22 to derive total ink coverage over a given area, in this case, 8 pixels×8 scan lines in size. The output of accumulator 22 is a value m, the predicted or measured ink coverage value for each separation of the given area of the image. The values of $I_N(y)$, measured for each of the cyan, magenta, yellow and black separation bitmaps, are added to derive a value m, which is the predicted or measured ink coverage value for the given area of the image. It is possible that some colors bleed more than others; if so, some separations might be weighted more heavily in the summation.

An 8 pixel by 8 scan line block for the given area has been selected for processing convenience, and because it reflects a useful size for the ink reduction determination. If the area is too large, the ink coverage variations will be averaged in the reduction determination, giving low ink coverage indications when portions within the large area exceed the maximum desirable ink coverage. The choice of area or window size is a compromise between the precision with which coverage can be measured (the larger the area the more possible ink coverage levels) and the (local) accuracy of its measurement. One way of increasing the precision without reducing the locality is to use a weighted sum (more heavily weighting the center) to find the coverage near the center of the window. This would work best for finding the coverage in the neighborhood of a single pixel. In this embodiment, coverage was determined using an unweighted average over the 8×8 area, as, if this area should prove satisfactory, it would be much less expensive to compute. Finally, there is very little difference between using an 8×8 window and, for example a 6×6 window. Of course, many possible areas of different sizes can be used. The 8×8 window allows for greater efficiency of implementation as it uses complete bytes. Computing coverage in an 8×8 window, always aligned on a 4 bit boundary can be done efficiently using small tables. When the window is byte-aligned, a 256 entry table may be indexed by the contents of the scanline covered by the window, for each scanline in the window, summing the results; when it is not byte-aligned, two 16-element tables for may be indexed for each each scanline, to compute:

$$c[p1 \ \&0xf] + c[p2 >> 4],$$

where p1 and p2 are the values in the image beneath the window;

c is an appropriately initialized table having 16 entries giving bit counts.

This expression refers to the use of the low order four bits of p1, and the high order bits of p2 to index into table c.

Value m is used at ON/OFF logic 24 to apply the turn off ratio $d/_m$ to each separation of the image, where d represents the maximum desired number of pixels ON in an area, and $d/_m$ therefore represents a ratio reflecting that d pixels out of every m pixels in a separation bitmap should be left on. It may be convenient to compare ratio $d/_m$ to 1, where a ratio greater than 1 indicates no need to turn off any pixels. It will be assumed hereinafter that such a comparison has taken place and has indicated a value of $d/_m$ less than 1. In one implementation, ON/OFF logic 38 may include a counter, which counts from 0 to m by increments of d for each pixel on in $B_C(x,y)$. Upon reaching or exceeding m, an output representing an ON signal is produced, to indicate that the current pixel should be left on. This will be further illustrated hereinafter.

There are many possible ways to determine ink coverage for an image, and particularly for binary printers. For binary printers, the presence or absence of a print dot in each separation can be taken as a predicted amount of ink. By summing all the print dots in an area small enough to be useful in the ink reduction determination, a predicted value of ink coverage can be made. In a multilevel or gray level printer, the measured amount of ink is a function of the gray level value of the pixel, or the percentage of the maximum ink value deposited at a pixel in the image.

The requirement that regions that need no change receive no change is met by never turning ON pixels that were originally OFF, and only turning OFF pixels where the coverage is too high.

Figure 2A:
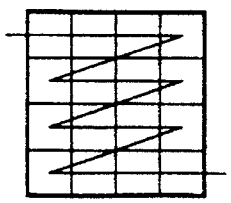
FIGS. 2A–2E are examples of processing patterns useful in the present invention.
Figure 2B:
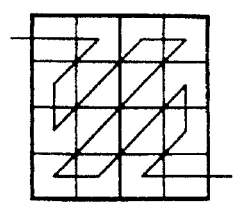
Figure 2C:
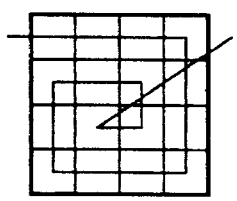
Figure 2D:
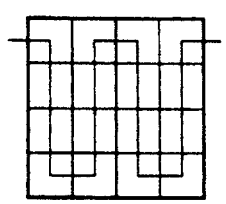
Figure 2E:
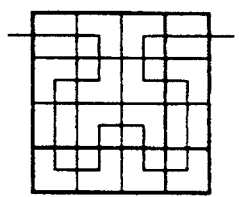

As applied to cyan bitmap $B_C(x,y)$, the "turn OFF ratio" or ON/OFF ratio of $d/_m$ would result in a periodic pattern, which, when imposed on a halftone pattern probably existing in $B_C(x,y)$, ,would result in undesirable moiré patterns in the reproduction of the image. Accordingly, one method of alleviating this problem is to randomize the application of the turn OFF ratio to the bitmap. However, it is also desirable that the determination of ON/OFF be made with knowledge of the determination for adjacent pixels, so that the application of the turn OFF ratio can be applied uniformly through the given area. Accordingly, and with reference to FIGS. 2A–E, where FIG. 2A shows the usual method of progressing through a bitmap, processing pixels 1 to n, from scan line 1 to scan line k, FIGS. 2B-E show other processing orders (shown for only 4×4 areas, as will be explained below), with a preferred processing order being the area filling curve of FIG. 2E. It will no doubt be appreciated that other processing orders are possible, which process pixels in an order that is relatively random with respect to common halftone patterns, and retains dependence on adjacent pixels. Ordering of pixels is accomplished by storing a 4×4 set of pixels for which m has been determined in memory 25, and subsequently reading the values of $B_C(x,y)$ out of memory with processing order control 26, which reorders pixels of $B_C(x,y)$ in accordance with the selected pixel order function.

Once the turn OFF ratio $d/_m$ for an 8×8 set of pixels is determined, that ratio is applied to a 4×4 pixel grouping therewithin, processed in accordance with the process ordering of FIGS. 2B-E. The use of an 8×8 area for determining the turn OFF ratio smooths abrupt changes which might occur if a smaller area is used for that determination.

At ON/OFF logic 24, a logical process is employed implementing the determined turn OFF ratio. The fraction of pixels to be left ON is the ratio of the desired coverage to the measured coverage. Pixels are spaced as uniformly as possible along the path that gives the order in which they are visited. One way of ensuring this uniformity is as follows:

```
f = 0
for each pixel that is on in this separation
    f = f + d/m;
    if(f ≥ 1)
        turn on this pixel
        f = f - 1
    next pixel.
```

The control variable f, represents the fraction of the distance along the path that the current pixel is from the last pixel to be turned on to the next pixel to be turned on. It will be noted that this logic is similar to Bresenham's algorithm for drawing lines, which for computer graphics determines the distance along a first axis, before a step must be made in the second axis for a line extending in two axes.

If the control variable f, is initialized only at the start of the page, and not in each window, the average over a larger region will be correct. By scaling f by m, the use of non-integer values is eliminated. The initial setting of f to zero is arbitrary, as over an entire image the initial value of f is of no consequence (so long as it is not too far from 0). To reduce inter-separation correlations it may be advantageous to use various values between −m and m for the initial settings of the control variable for different separations. The comparison with m is also arbitrary: as long as it is compared with a constant value, the test will succeed, on average, the appropriate fraction of the time. Furthermore, if it is compared with an unbiased random number, the uniformity will be preserved, in the long run, but disturbed locally, reducing the potential for patterns. From all of these considerations, the following method derives:

```
f = -m
for each pixel that is ON in this separation
    f = f + d;
    generate a random number r
    if(f ≥ r)
        turn on this pixel
        f = f - m
    next pixel.
```

To obtain random numbers with a suitably even distribution at high speed, the method of Lewis and Payne (Lewis, T. G. and W. H. Payne, "Generalized Feedback Shift Register Pseudorandom Number Algorithm", Journal of the Assn. for Computing Machinery, Vol. 20, No. 3 (1973), pp. 456–468) is adapted. The method generates a stream of one bit random numbers with a period of $2^{k-1}$, using a shift register of k bits. One choice is k=31, a Mersenne prime as recommended by Bright and Enison (Bright, H. S. and R. L Enison, "Quasi-Random Number Sequences from a Long-Period TLP Generator with Remarks on Application to Cryptography", Computing Surveys, 11, 4, 1979). On each cycle, the register is shifted one to the right, the low order bit having first been XORed with the twelfth bit left from the lowest order. This new value (the result of the XOR) is shifted in from the left, and used as the current one bit random number. By running a number p of these in parallel, suitably shifted, and selecting 6 of the kp bits, a six bit random number is generated. A different concatenation of 6 bits is selected for each of the four separations. A new random number can be generated every clock cycle.

Figure 8:
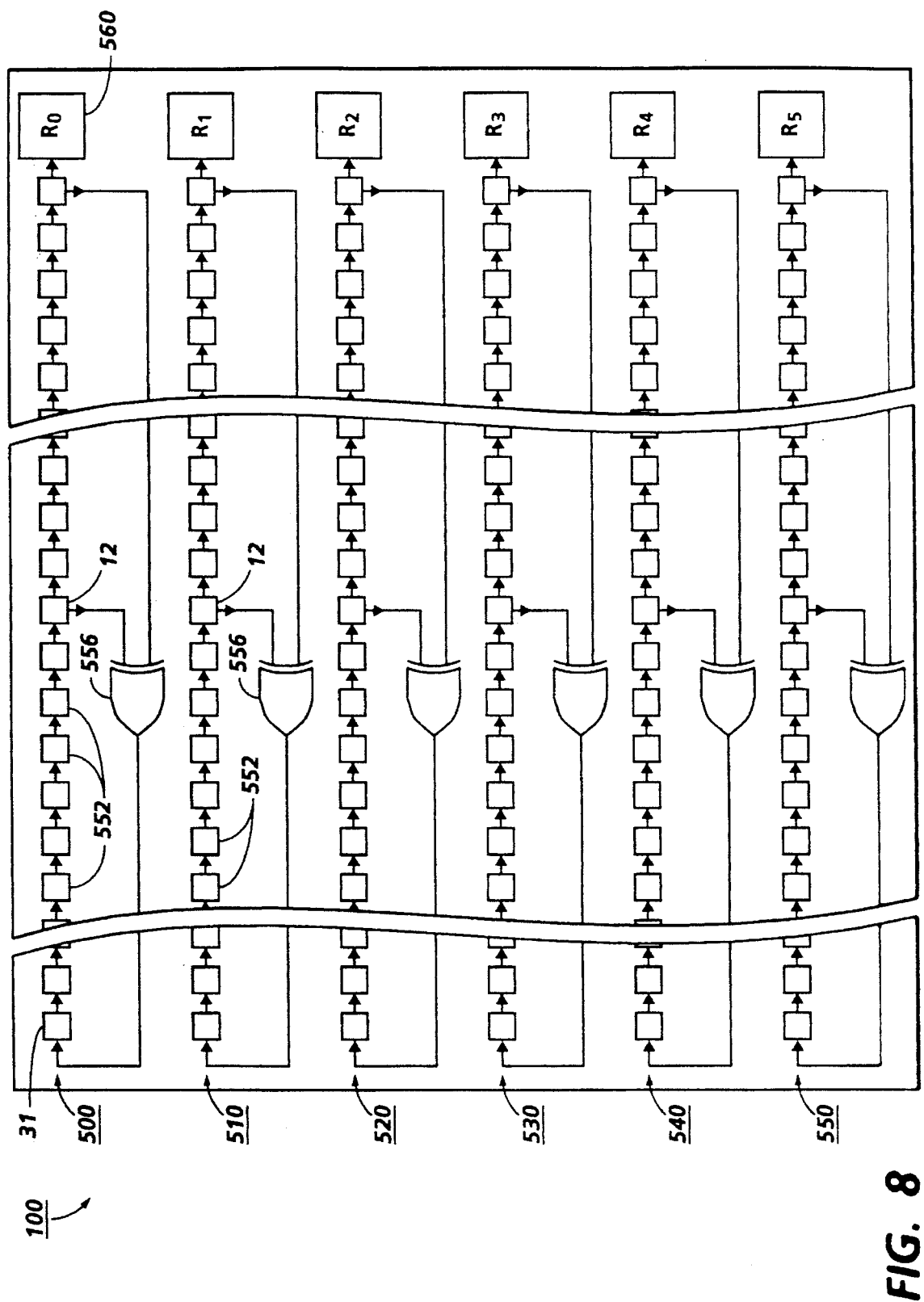
FIG. 8 illustrates a random number generator suitable for use in the present invention.

A hardware implementation is illustrated at FIG. 8, where a random number generator is illustrated for unsigned random numbers in the range of 0 . . . 63. If these are treated as signed, the numbers are −32 . . . 31. Shift registers 500–550 each include a set of 31 data latches 552, which have an ON or an OFF state indicated as 1 or 0. The zeroth, and twelfth latch (counting from the zeroth latch) are connected to XOR gate 556, with the output thereof stored to the 31st latch. The zeroth latch is connected to an output latch 560, which forms one bit ($R_0$) of a 6 bit number {$R_0$, $R_1$, $R_2$, $R_3$, $R_4$, $R_5$,} which forms R. Here follows a software routine in C code for a software implementation:

```
#define p 31
#define q 13
#define INTSIZE 8
#define ONE 1 < < (INTSIZE − 1)
static unsigned char W[p] =
{62,41,158,143,57,145,72,198,168,123,152,31,86,
92,155,40,165,184,96,114,165,65,22,82,237,234,120,217,16
4,97,176,};
char gfsr( )
{
    static int k = 0;
    static int j = q2 if(+ +k = = p) k = 0;
    if(+ +j = = p) j = 0;
    W[j] = W[k];
    return W[j];
}
```

The W array is the shift registers. Each element of the array is equivalent to a column of the latches in FIG. 8; the concatenation of the ith bits of all of them represents a single 31 bit shift register. The indices j and k point at the virtual low order (0th) bit and twelfth bits. (The difference being 13.) At each step, both of these indices advance, wrapping around to zero when they need to (this simulates the effect of shifting). The last step is to perform the exclusive or of the twelfth element of the virtual shift register with the 0th element. All eight shift registers are exclusive ORed at once, due to the arrangement of the data.

At block 38, the function is reordered into the original image order as $B_{CON/OFF}(x,y)$, which is a mask representing the turn OFF function. At block 40, white pixel prevention logic is provided, to prevent the occurrence of a corresponding pixel in every separation from being turned OFF, which might allow white or background show through. Assuming 100% coverage is acceptable, totally white pixels should not be introduced into the image. Thus, if a full color pixel has 200% coverage, and a pixel in one separation is turned OFF, the corresponding pixels in other separations should not all be turned OFF when that pixel is visited for the other separation:

```
fC = 0
fM = m/4
fY = m/2
fK = 3m/4
calculate the pixelwise coverage
for each pixel/separation pair, in some order
    if this pixel is on in this separation
        fsep = fsep + d
        generate r, a small random number
        if(fsep > = r) or the coverage in this pixel is 1
            turn on this pixel
            fsep = fsep – m
        else
            turn OFF this pixel
            decrement the coverage in this pixel by 1
```

Accordingly, a set of ON/OFF conditions is created for a 4×4 area of the image, reducing the number of ON pixels in that area in accordance with the determining turn OFF ratio, $B'_{CON/OFF}(x,y)$. This set of values is then used as an input to a masking logic 42, which uses $B'_{CON/OFF}(x,y)$ in altering the bitmap $B_C(x,y)$ at block 42 from which the now adjusted image $B'_C(x,y)$ is directed to the printer controller.

Figure 3:
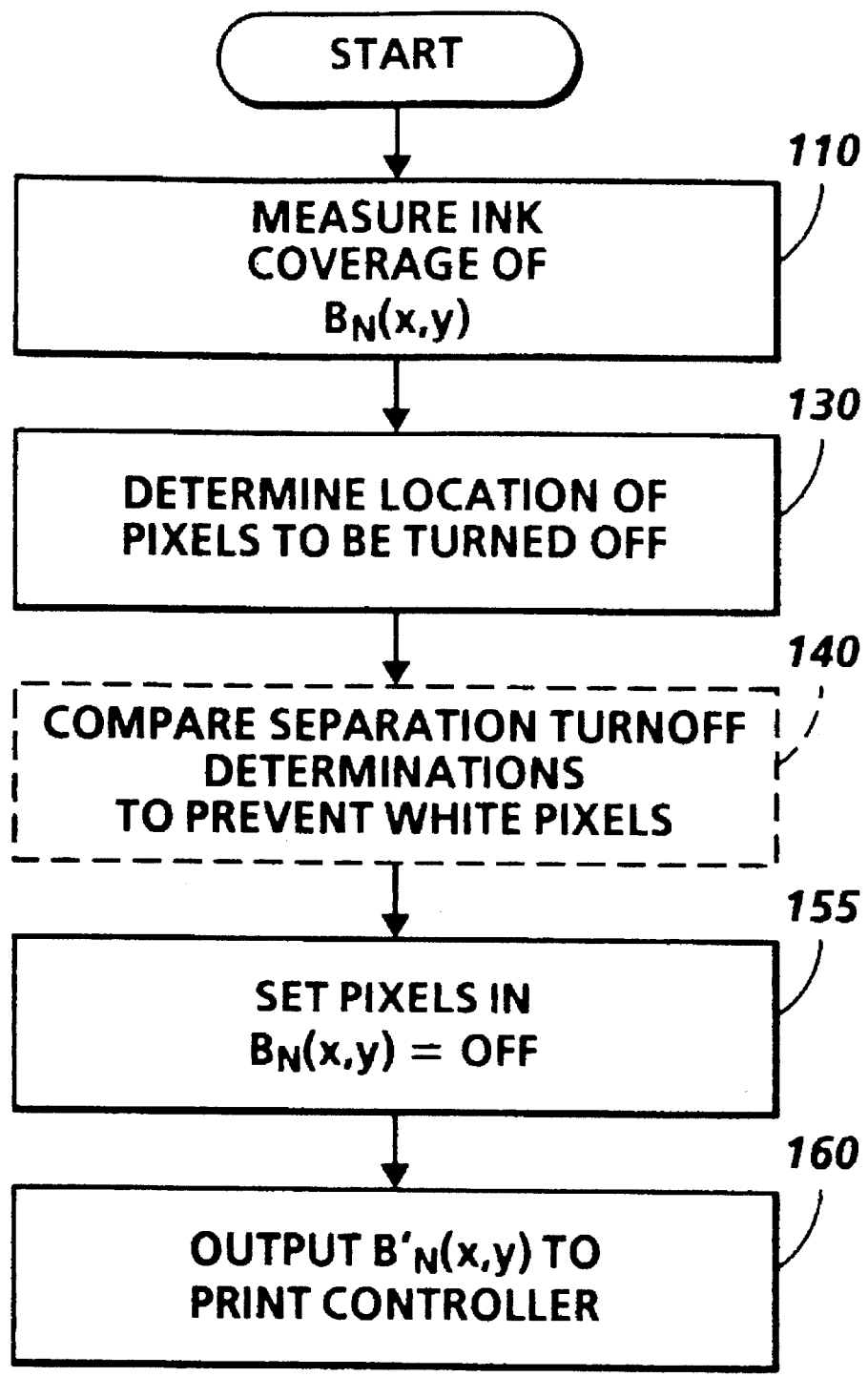
FIG. 3 shows a flow chart demonstrating the overall inventive method.

FIG. 3 presents the process steps in the described embodiment, which generally include the steps of 110) measuring potential ink coverage in separation N of B(x,y); 130) determining the location in the image of pixels which should be turned OFF in accordance with the turn OFF ratio; 140) comparing each separation with the others to prevent corresponding pixels in each separation from being all turned OFF; 160) setting pixels in the separation of B(x,y) OFF and 170) outputting the adjusted image to a print controller.

Figure 4:
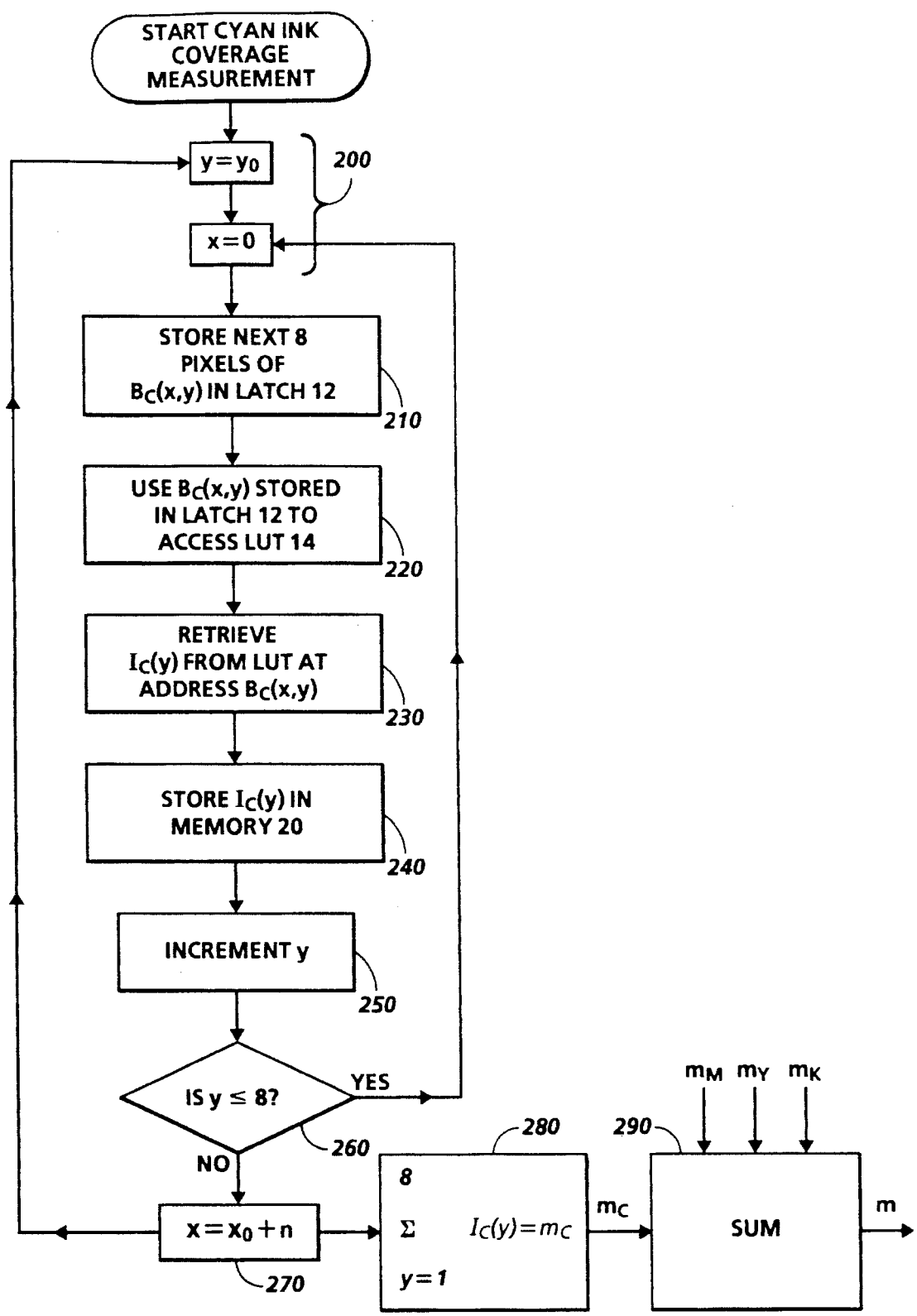
FIG. 4 shows a flow chart of the method of determining ink coverage.

At FIG. 4, where a flow chart is shown for a single pass across an image, ignoring image edges, the method of ink coverage measurement includes the steps of 200) for the cyan bitmap $B_C(x,y)$ initializing the scan line and pixel values to a starting value (here, 0 and $Y_0$); 202) storing a first subset of pixels (here, 8) from a first scan line at latch 12; 220) using the stored 8 bit value to access a memory location in LUT 14; 230) retrieving an ink coverage value $I_C(y)$ for the set of pixels; and 240) storing the set ink coverage value $I_C(y)$ in memory 20. At step 250, the scan line value is incremented so that the process may be repeated for the next subset of pixels from a second scan line, etc. If a desired area of coverage, here an 8 scan line region, has been examined, the test of step 260 is met, the scan line value is reset to $y_0$ and at step 270, the pixel value is set for the next subset of pixels in each scan line. If the test at step 260 is met, the ink coverage value $m_C$ for the 8×8 area in the separation is determined by a standard summing function, indicated by the equation of step 280. At step 290, $m_C$, $m_M$, $m_Y$, $m_K$ are summed to derive a value of m for the given area of the image.

Figure 5:
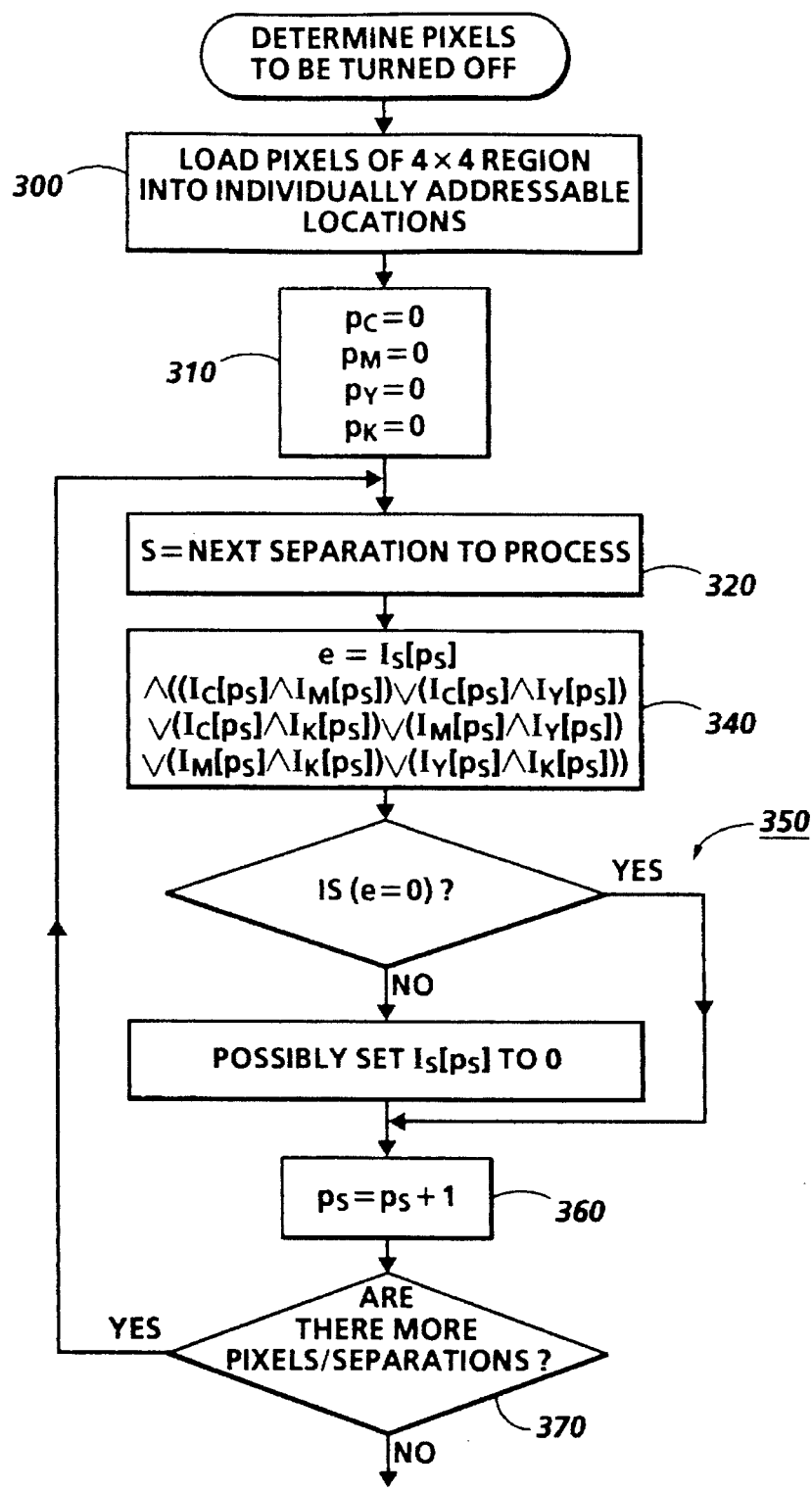
FIGS. 5 and 6 show a flow chart of the method of determining whether a pixel should be designated as OFF.

At FIG. 5, a flow chart is shown for a single pass across a 4×4 window of an image, the substeps of the pixel ON/OFF determination are shown, including: 300) loading the pixels of the 4×4 region into 64 individually addressable one-bit locations; 310) initializing four index counters $p_C$, $p_M$, $p_Y$, and $p_K$ to zero; 320) selecting a separation s to process next; 340) finding the address in lookup table $l_S$ of the next one bit location to consider for possible turn-off, the address being computed as $I_S[p_S]$, and forming the boolean expression $e=I_S[p_S] \wedge ((I_C[p_S] \wedge I_m[p_S]) \vee (I_C[p_S] \wedge I_Y[p_S]) \vee (I_C[p_S] \wedge I_K[p_S]) \vee (I_m[p_S] \wedge I_Y[p_S]) \vee (I_m[p_S] \wedge I_K[p_S]) \vee (I_Y[p_S] \wedge I_K[p_S]))$; 350) if e is not 0, possibly setting $I_S[p_S]$ to 0 (see below); 360) incrementing $p_S$ by 1; and 370) repeating the process from step 320 until all sixteen pixels have had all four separations considered. The boolean expression computed in step 340 is 1 (true) if the pixel is set in the current separation, and a pixel having the same location is set in at least one of the other separations. This prevents a pixel from becoming white.

Figure 6:
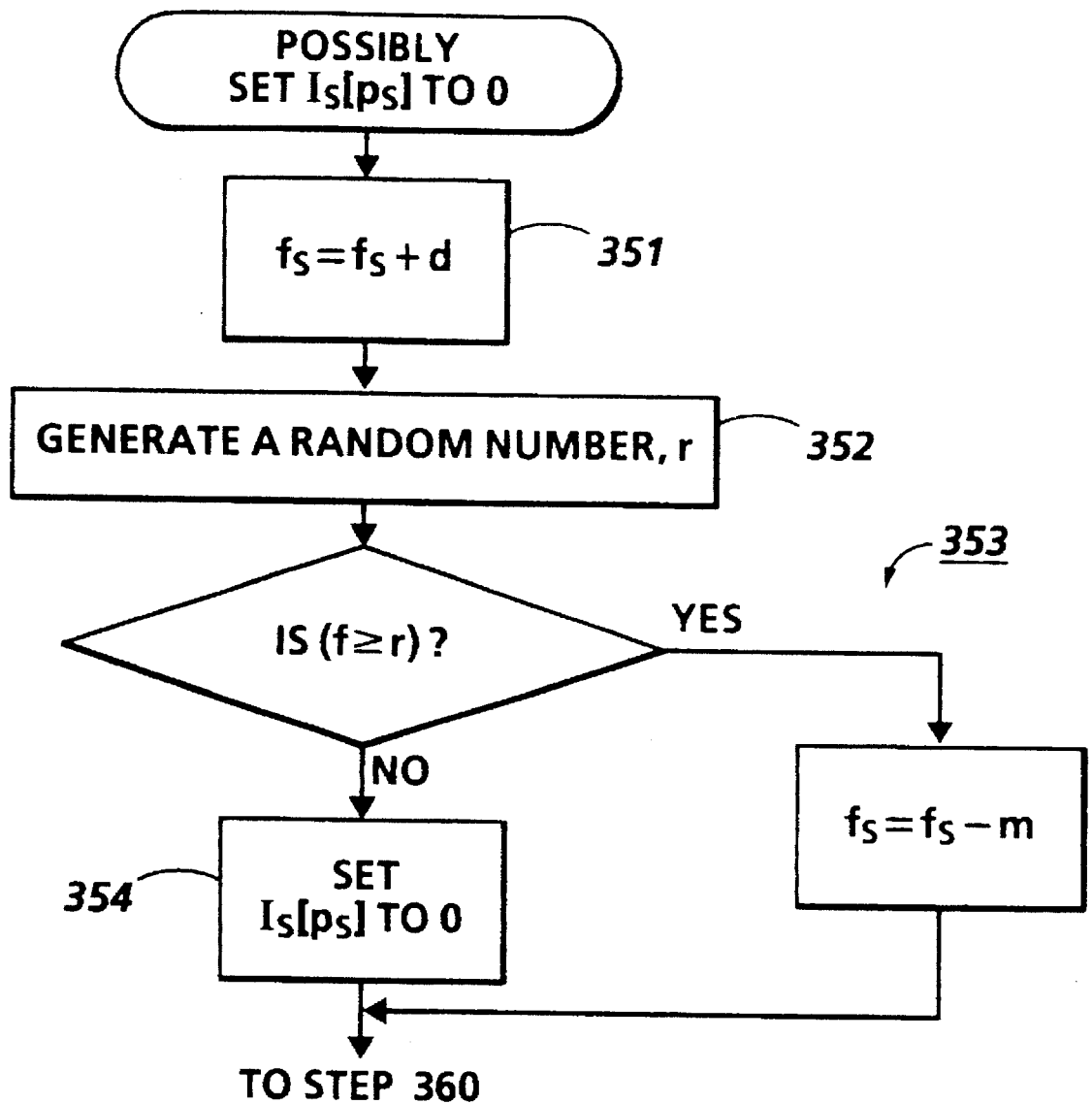

In FIG. 6, step 350 (the step of possibly setting $I_S[p_S]$ to 0) is further elaborated. It includes the substeps of: 351) adding d to $f_S$; 352) generating a small random number r; 353) comparing $f_S$ to r, and decrementing $f_S$ by m if $f_S$ is greater than r, and 354) setting $I_S[p_S]$ to zero otherwise. It will be understood that, as in the previous U.S. patent application Ser. No. 07/917,643, to Klassen, filed Jul. 23, 1992, white pixel prevention logic may be combined with the ON/OFF logic, or provided independently, as below.

Figure 7:
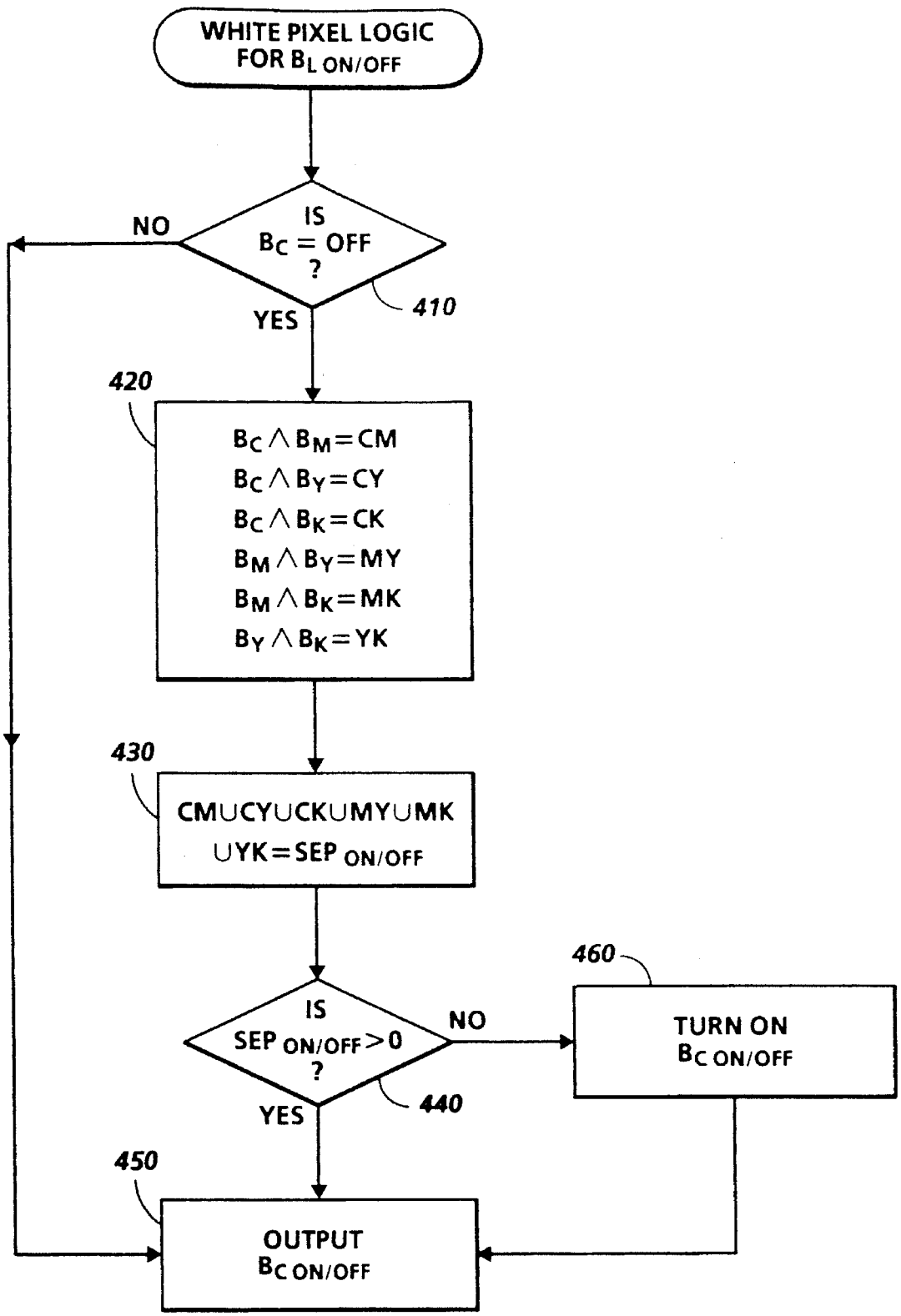
FIG. 7 shows the separate step of the method of white pixel prevention.

As discussed, it is highly desirable that the turn OFF routine does not leave white pixels in fields originally containing color pixels. With reference to FIG. 7, a flow chart illustrates $B_{CON/OFF}(x,Y)$ white pixel prevention, if $B_{CON/OFF}(x,Y)$ is OFF (step 410), then each separation turn off function $B_{NON/OFF}(x,y)$ (represented for the purpose of this figure as $B_C$, $B_M$, $B_Y$, $B_K$) is ANDed with the others (step 420) to derive CM, CY, CK, MY, MK, YK, which are then ORed together to derive a determination $SEP_{ON/OFF}$. If $SEP_{ON/OFF}$ is greater than 0 (Step 440), then at least one of the separations is to be turned ON, and no action is required. $B_{CON/OFF}(x,y)$ is directed to an output at step 450. However if $SEP_{ON/OFF}$ is equal to 0 (Step 440), then $B_{ON/OFF}(x,y)$ is turned ON. This is a rather simplistic solution, since undoubtedly, the choice of separation which is turned ON in white pixel prevention should be alternated among the separations that were turned OFF. Otherwise, if, for example, the cyan separation is always processed first, then the image may be skewed with a greater amount of cyan than desired.

While the present invention is demonstrated with the above embodiment, there is no doubt many others accomplish the invention. The important aspects of the invention are that ink coverage can be measured by reference to the bitmap of the image, and that by a comparison of measured ink coverage with desired ink coverage, an ON/OFF ratio can be determined and applied to the pixels in the separations of the image to reduce ink coverage. Preferably, the determination is made in a manner that minimizes moire, and preferably, makes a random determination of OFF or ON in any single separation with knowledge, while maintaining average coverage. The present description assumes a binary or bilevel ink jet printer, but there is no reason in principle that the invention would not apply to a gray or other multilevel printer, where ink coverage is a function not only of the presence of a print dot, but also the gray level value of the print dot.

Other printing processes which are printed on a pixel by pixel basis also have problems with excessive marking material, and may benefit from the described method or reduced marking material use. Notably, electrophotographic and ionographic printing methods using a pixel by pixel printing process for forming a latent image for development with dry or liquid toner marking materials, can suffer from excessive marking material, evidenced by sheet cockling and curling caused by differential shrinkage of toner and paper in the printing process.

The invention has been described with reference to a particular embodiment. Modifications and alterations will occur to others upon reading and understanding this specification. It is intended that all such modifications and alterations are included insofar as they come within the scope of the appended claims or equivalents thereof.

We claim:

1. A method for processing a color image for printing to reduce an amount of marking material used therefor, the color image comprised of multiple separations each defined by a bitmap of single bit pixels each having a pixel value and arranged in an array of scan lines, including the steps of:

for each separation bitmap, measuring a marking material coverage value over a given area within the image, directing pixel values of a set of k pixels from a single scan line of pixels into a latch, where k is an integer number of pixels, providing a pre-loaded look up table, having a set of k bit addresses, each address corresponding to data entries including a possible combination of marking material coverage values for a set of k pixels, storing to a memory, the marking material coverage values from the look up table corresponding to each set of k pixel values for a set of l scan lines, and summing for the image, the marking material coverage values for each separation over the area of a set of k pixel values in a set of l scan lines;

summing the measured marking material coverage of each separation bitmap to determine measured marking material coverage for the color image;

comparing desired marking material coverage with measured marking material coverage to derive an ON/OFF ratio, where the ON/OFF ratio represents a fraction of pixels to be turned OFF, compared to the number of pixels in the given area of the separation;

randomly setting a fraction of pixels to OFF in the given area of the separation bitmap, in accordance with the turn OFF ratio; and outputting the separation bitmap to a print controller.

2. A method for processing a color image for printing to reduce an amount of marking material used therefor, the color image comprised of multiple separations each defined by a bitmap of single bit pixels each having a pixel value and arranged in an array of scan lines, including the steps of:

for each separation bitmap, measuring a marking material coverage value over a given area within the image;

summing the measured marking material coverage of each separation bitmap to determine measured marking material coverage for the color image;

comparing desired marking material coverage with measured marking material coverage to derive an ON/OFF ratio, where the ON/OFF ratio represents a fraction of pixels to be turned OFF, compared to the number of pixels in the given area of the separation;

randomly setting a fraction of pixels to OFF in the given area of the separation bitmap, in accordance with the turn OFF ratio and incrementing a counter value by a predetermined amount related to the OFF/ON ratio, whereby increasing the counter value increases the likelihood of the pixel being set OFF;

comparing the counter value with a random value to determine whether to set the pixel OFF;

upon determining that a pixel should be turned OFF, resetting the counter so that the next pixel has a decreased probability of being turned OFF;

logically processing the pixel value and the ON/OFF determination to determine the separation bitmap to be output; and outputting the separation bitmap to a print controller.

3. A method for processing a color image for printing to reduce an amount of marking material used therefor, the color image comprised of multiple separations each defined by a bitmap of single bit pixels each having a pixel value and arranged in an array of scan lines, including the steps of:

for each separation bitmap, measuring a marking material coverage value over a given area within the image;

summing the measured marking material coverage of each separation bitmap to determine measured marking material coverage for the color image;

comparing desired marking material coverage with measured marking material coverage to derive an ON/OFF ratio, where the ON/OFF ratio represents a fraction of pixels to be turned OFF, compared to the number of pixels in the given area of the separation, and determining the location in the image of pixels which should be turned off in accordance with the turn off ratio;

randomly setting a fraction of pixels to OFF in the given area of the separation bitmap, in accordance with the turn OFF ratio; and outputting the separation bitmap to a print controller.

4. The method as defined in claim 3, wherein the step of determining the location in the image of pixels which should be turned off in accordance with the turn off ratio includes the substep of:

processing the pixels within the given area in a predetermined order.

5. The method as defined in claim 4, wherein the predetermined order corresponds to the path of a space filling function through each pixel in the given area.

6. The method as defined in claim 3, wherein the step of determining the location in the image of pixels which should be turned OFF in accordance with the turn OFF ratio includes the additional step of:

comparing the state of corresponding pixels in each separation bitmap and upon detection of a concurrence of pixels turned OFF, turning at least one pixel ON.

7. A method for processing a color image for printing by an ink jet printer to reduce ink used thereby, the color image comprised of multiple separations each defined by a bitmap of single bit pixels each having a pixel value and arranged in an array of scan lines, including the steps of:

for each separation bitmap, measuring an ink coverage value over a given area within the image and summing the ink coverage of each bitmap to determine total ink coverage including:

directing pixel values of a set of k pixels from a single scan line of pixels into a latch, where k is an integer number of pixels, providing a pre-loaded look up table, having a set of k bit addresses, each address corresponding to data entries including a possible combination of ink coverage values for a set of k pixels, storing to a memory, the ink coverage values from the look up table corresponding to each set of k pixel values for a set of l scan lines, and summing for the image, the ink coverage values for each separation over the area of a set of k pixel values in a set of l scan lines;

comparing desired ink coverage with measured total ink coverage to derive an ON/OFF ratio, where the ON/OFF ratio represents a fraction of pixels to be turned OFF, compared to the number of pixels in the separation;

randomly setting a fraction of pixels to OFF in the given area of the separation bitmap in a larger number of pixels in the separation, in accordance with the turn OFF ratio; and outputting the separation bitmap to a print controller.

8. A method for processing a color image for printing by an ink Jet printer to reduce ink used thereby, the color image comprised of multiple separations each defined by a bitmap of single bit pixels each having a pixel value and arranged in an array of scan lines, including the steps of:

for each separation bitmap, measuring an ink coverage value over a given area within the image and summing the ink coverage of each bitmap to determine total ink coverage;

comparing desired ink coverage with measured total ink coverage to derive an ON/OFF ratio, where the ON/OFF ratio represents a fraction of pixels to be turned OFF, compared to the number of pixels in a separation;

randomly setting a fraction of pixels to OFF in the given area of the separation bitmap in a larger number of pixels in a separation, in accordance with the turn OFF ratio including:

incrementing a counter value by a predetermined amount related to the OFF/ON ratio, whereby increasing the counter value increases the likelihood of the pixel being set OFF, comparing the counter value with a random value to determine whether to set the pixel OFF, upon determining that a pixel should be turned OFF, resetting the counter so that the next pixel has a decreased probability of being turned OFF, logically processing the pixel value and the ON/OFF determination to determine the separation bitmap to be output; and outputting the separation bitmap to a print controller.

9. A method for processing a color image for printing by an ink jet printer to reduce ink used thereby, the color image comprised of multiple separations each defined by a bitmap of single bit pixels each having a pixel value and arranged in an array of scan lines, including the steps of:

for each separation bitmap, measuring an ink coverage value over a given area within the image and summing the ink coverage of each bitmap to determine total ink coverage;

comparing desired ink coverage with measured total ink coverage to derive an ON/OFF ratio, where the ON/OFF ratio represents a fraction of pixels to be turned OFF, compared to the number of pixels in a separation and determining the location in the image of pixels which should be turned OFF in accordance with the turn off ratio;

randomly setting a fraction of pixels to OFF in the given area of the separation bitmap in a larger number of pixels in the separation, in accordance with the turn OFF ratio; and outputting the separation bitmap to a print controller.

10. The method as defined in claim 9, wherein the step of determining the location in the image of pixels which should be turned off in accordance with the turn off ratio includes the substep of:

processing the pixels within the given area in a predetermined order.

11. The method as defined in claim 10, wherein the predetermined order corresponds to the path of a space filling function through each pixel in the given area.

12. The method as defined in claim 9, wherein the step of determining the location in the image of pixels which should be turned OFF in accordance with the turn OFF ratio includes the additional step of:

comparing the state of corresponding pixels in each separation bitmap and upon detection of a concurrence of pixels turned OFF, turning at least one pixel ON.

13. A method for processing a color image for printing, to reduce an amount of marking material used thereby, the color image comprised of multiple separations each defined by a bitmap of single bit pixels each having a pixel value and arranged in an array of scan lines, including the steps of:

directing pixel values of a set of k pixels from a single scan line of pixels into a latch, where k is an integer number of pixels;

providing a pre-loaded look up table, having a set of k bit addresses, each address corresponding to data entries including a possible combination of marking material coverage values for a set of k pixels;

storing to a memory, the marking material coverage value from the look up table corresponding to each set of k pixel values for a set of l scan lines;

summing the marking material coverage values for the set of l scan lines to derive a marking material coverage value for the area of k pixels by l scan lines in each separation;

summing the marking material coverage values for the separations to derive a marking material coverage value for the image over an area of K pixels by l scan lines;

determining the location in the image of pixels which should be turned OFF in accordance with the turn OFF ratio;

incrementing a counter value by a predetermined amount related to the turn OFF ratio, whereby increasing the counter value increases the likelihood of the pixel being set OFF;

comparing the counter value with a random value to determine whether to set the pixel OFF;

upon determining that a pixel should be turned OFF, resetting the counter so that the next pixel has a decreased probability of being turned OFF;

logically processing the pixel value and the ON/OFF determination to determine the separation bitmap to be output; and outputting each separation bitmap so processed to a printer.

14. The method as defined in claim 13, wherein the step of determining the location in the image of pixels which should be turned OFF in accordance with the turn OFF ratio includes the substep of:

processing the pixels within the given area in a predetermined order.

15. The method as defined in claim 13, wherein the predetermined order corresponds to the path of a space filling function through each pixel in the given area.

16. The method as defined in claim 13, wherein the step of determining the location in the image of pixels which should be turned OFF in accordance with the turn OFF ratio includes the additional step of:

comparing the state of corresponding pixels in each separation bitmap and upon detection of a concurrence of pixels turned OFF, turning at least one pixel ON.

17. A device for processing a color image comprised of multiple separations each defined by a bitmap of single bit pixels for printing, for the reduction of marking material used in the color image, including:

means for predicting the marking material coverage of an area in the output image as a function of the input image;

means for determining a ratio of pixels to be turned OFF, as a function of the desired marking material coverage and the predicted marking material coverage, said means performing the functions of:

maintaining a count value incremented for each pixel processed by a predetermined amount related to the turn OFF ratio, whereby increasing the counter value increases the likelihood of the pixel being set OFF, comparing the count value with a random value to determine whether to set the pixel OFF, and resetting the counter so that the next pixel has a decreased probability of being turned OFF;

locating means for determining in a separation of the image, locations of pixels which should be turned OFF in accordance with the turn OFF ratio;

turn off determining means for determining whether a pixel should be turned OFF in accordance with the turn OFF ratio in accordance with a random number function;

a masking function, having as inputs the pixel values in each separation and the turn OFF ratio determination from said turn OFF determining means, and having as an output a pixel value for a reduced marking material image; and output means for directing the separation bitmap to a print controller.

18. A device for processing a color image comprised of multiple separations each defined by a bitmap of single bit pixels for printing, for the reduction of marking material used in the color image, including:

means for predicting the marking material coverage of an area in the output image as a function of the input image;

means for determining a ratio of pixels to be turned OFF, as a function of the desired marking material coverage and the predicted marking material coverage;

locating means for determining in a separation of the image, locations of pixels which should be turned OFF in accordance with the turn OFF ratio;

turn OFF determining means for determining whether a pixel should be turned OFF in accordance with the turn OFF ratio in accordance with a random number function, including means for comparing the state of corresponding pixels in each separation bitmap and upon detection of a concurrence of pixels turned OFF, turning at least one pixel ON;

a masking function, having as inputs the pixel values in each separation and the turn OFF ratio determination from said turn OFF determining means, and having as an output a pixel value for a reduced marking material image; and output means for directing the separation bitmap to a print controller.

* * * * *